(12) United States Patent
Oike et al.

(10) Patent No.: US 7,248,435 B2
(45) Date of Patent: Jul. 24, 2007

(54) THIN-FILM MAGNETIC HEAD WITH GAP AND POLE PORTION LAYERS HAVING CROSS SECTIONS OF THE SAME SHAPES AND PREDETERMINED PARAMETER RANGES

(75) Inventors: Taro Oike, Tokyo (JP); Kiyoshi Noguchi, Tokyo (JP); Seiji Yari, Tokyo (JP)

(73) Assignee: TDK Corporation, Tokyo (JP)

( * ) Notice: Subject to any disclaimer, the term of this patent is extended or adjusted under 35 U.S.C. 154(b) by 443 days.

(21) Appl. No.: 10/827,632

(22) Filed: Apr. 20, 2004

(65) Prior Publication Data
US 2004/0228032 A1   Nov. 18, 2004

(30) Foreign Application Priority Data
May 14, 2003   (JP)   .............................. 2003-136549

(51) Int. Cl.
G11B 5/31   (2006.01)
G11B 5/23   (2006.01)
G11B 5/39   (2006.01)

(52) U.S. Cl. ...................................... 360/126; 360/119
(58) Field of Classification Search ................ 360/126, 360/125, 119, 317
See application file for complete search history.

(56) References Cited

U.S. PATENT DOCUMENTS

| 5,285,340 | A  |  2/1994 | Ju et al. .................... 360/119 |
| 5,473,491 | A  | 12/1995 | Fujisawa et al. ............ 360/126 |
| 6,043,959 | A  |  3/2000 | Crue et al. .................. 360/113 |
| 6,333,841 | B1 | 12/2001 | Sasaki ......................... 360/317 |
| 6,381,093 | B2 * |  4/2002 | Yoshida et al. ............. 360/126 |
| 6,487,041 | B2 * | 11/2002 | Yamanaka et al. .......... 360/126 |
| 6,490,127 | B1 * | 12/2002 | Sasaki ......................... 360/126 |
| 6,624,971 | B1 * |  9/2003 | Sasaki ......................... 360/126 |
| 7,167,340 | B2 |  1/2007 | Sato et al. |
| 2001/0013992 | A1 |  8/2001 | Tagawa et al. |
| 2002/0018317 | A1 * |  2/2002 | Sato et al. .................. 360/126 |
| 2002/0030929 | A1 * |  3/2002 | Sasaki ......................... 360/126 |
| 2003/0048581 | A1 * |  3/2003 | Ohtomo et al. ............. 360/126 |
| 2003/0151856 | A1 * |  8/2003 | Sasaki et al. ................ 360/126 |

FOREIGN PATENT DOCUMENTS

| JP | A 6-28626     |  2/1994 |
| JP | A 6-314413    | 11/1994 |
| JP | A 11-353616   | 12/1999 |
| JP | A-2000-099919 |  4/2000 |
| JP | A 2001-118214 |  4/2001 |
| JP | A-2001-256611 |  9/2001 |

* cited by examiner

*Primary Examiner*—Craig A. Renner
(74) *Attorney, Agent, or Firm*—Oliff & Berridge, PLC (57) ABSTRACT

A bottom pole layer and a top pole layer respectively incorporate pole portion layers. Cross sections of the pole portion layers and a gap layer parallel to the top surface of a substrate are of the same shapes. The aggregate of the pole portion layers and the gap layer includes a first portion having a width W that defines the track width, and a second portion having a width greater than the width W of the first portion. L/W falls within a range of 2 to 5 inclusive, where L is the distance from a medium facing surface to the interface between the first portion and the second portion. S/(W×L) falls within a range of 5 to 40 inclusive, where S is the area of the cross section of the aggregate parallel to the top surface of the substrate.

3 Claims, 10 Drawing Sheets

THIN-FILM MAGNETIC HEAD WITH GAP AND POLE PORTION LAYERS HAVING CROSS SECTIONS OF THE SAME SHAPES AND PREDETERMINED PARAMETER RANGES

BACKGROUND OF THE INVENTION

1. Field of the Invention

The present invention relates to a thin-film magnetic head incorporating at least an induction-type electromagnetic transducer and a method of manufacturing such a thin-film magnetic head, and to a head gimbal assembly including a thin-film magnetic head, and a hard disk drive.

2. Description of the Related Art

Performance improvements in thin-film magnetic heads have been sought as a real recording density of hard disk drives has increased. Such thin-film magnetic heads include composite thin-film magnetic heads that have been widely used. A composite head is made of a layered structure including a write (recording) head having an induction-type electromagnetic transducer for writing and a read (reproducing) head having a magnetoresistive (MR) element for reading.

A write head comprises: a bottom pole layer and a top pole layer including magnetic pole portions opposed to each other and located in a region on a side of a medium facing surface, that is, a surface facing toward a recording medium; a write gap layer provided between the pole portion of the bottom pole layer and the pole portion of the top pole layer; and a thin-film coil at least part of which is disposed between the bottom and top pole layers and insulated from the bottom and top pole layers.

To enhance the recording density of the write head, it is particularly required to reduce the pole width that defines the write track width and to improve writing characteristics. However, if the pole width is reduced, the writing characteristics, such as an overwrite property that is a parameter indicating an overwriting capability, are reduced. Consequently, the smaller the pole width, the greater improvements in writing characteristics are required. To enhance the recording density of the write head, it is also required to suppress 'side erase' that is a phenomenon in which, when data is written on a specific track, data contained on an adjacent track is erased.

Thin-film magnetic heads are manufactured through semiconductor producing techniques. Therefore, a plurality of thin-film magnetic heads are manufactured at one time out of a single wafer. If an effective write track width is reduced down to 0.3 µm or smaller, for example, it is difficult to reduce variations in pole width of the thin-film magnetic heads manufactured out of the single wafer.

As disclosed in the Published Unexamined Japanese Patent Application Heisei 11-353616 (1999) and the U.S. Pat. No. 6,043,959, for example, one of the techniques known for manufacturing a thin-film magnetic head having a reduced pole width is to divide the top pole layer into a pole portion layer that defines the pole width and a yoke portion layer having a greater width. Another technique for manufacturing a thin-film magnetic head having a reduced pole width is a technique for trimming the pole portion as disclosed in the Published Unexamined Japanese Patent Application Heisei 11-353616 and the U.S. Pat. No. 6,043,959, too. This technique is to etch the write gap layer and at least a portion of the pole portion of the bottom pole layer close to the write gap layer, using the pole portion of the top pole layer as a mask, and to thereby align the sidewalls of the pole portion of the top pole layer, the write gap layer and at least the portion of the pole portion of the bottom pole layer. Dry etching is used for this etching.

Still another technique for manufacturing a thin-film magnetic head having a reduced pole width is to make the pole portion of the bottom pole layer, the write gap layer and the pole portion of the top pole layer have the same plane geometries as disclosed in the Published Unexamined Japanese Patent Application Heisei 6-28626 (1994) and the Published Unexamined Japanese Patent Application Heisei 6-314413 (1994). Through this technique, the pole portion of the bottom pole layer, the write gap layer and the pole portion of the top pole layer may be consecutively formed by plating through the use of a single photoresist frame.

A technique disclosed in the Published Unexamined Japanese Patent Application 2001-118214 is to form an insulating layer for defining the throat height on the layer underlying the bottom pole layer and then form a photoresist frame, and to form the pole portion of the bottom pole layer, the write gap layer and the pole portion of the top pole layer by plating through the use of the photoresist frame. The throat height is the length (height) from the medium facing surface to the point at which the space between the two pole layers starts to be created.

To control the pole width by using the technique for trimming the pole portion as disclosed in the Published Unexamined Japanese Patent Application Heisei 11-353616 and the U.S. Pat. No. 6,043,959, the pole width is controlled by dry etching. Therefore, there arises a problem in this case that variations in pole width of a plurality of thin-film magnetic heads manufactured out of a single wafer are increased.

In contrast, as disclosed in the Published Unexamined Japanese Patent Application Heisei 6-28626 and the Published Unexamined Japanese Patent Application Heisei 6-314413, to form the pole portion of the bottom pole layer, the write gap layer and the pole portion of the top pole layer through the use of a single photoresist frame, the pole width is controlled by photolithography. In this case, variations in pole width of a plurality of thin-film magnetic heads manufactured out of a single wafer are made smaller, compared to the case in which the pole width is controlled by dry etching. If the photoresist frame is formed on a flat surface, the frame is formed with accuracy. As a result, if the pole portion of the bottom pole layer, the write gap layer and the pole portion of the top pole layer are formed through the use of the photoresist frame formed on the flat surface, variations in pole width are made much smaller.

According to the thin-film magnetic head manufactured through the techniques disclosed in the Published Unexamined Japanese Patent Application Heisei 6-28626 and the Published Unexamined Japanese Patent Application Heisei 6-314413, the throat height is equal to the distance between an end located in the medium facing surface and the other end of the aggregate of the pole portion layer of the bottom pole layer, the write gap layer, and the pole portion layer of the top pole layer. Consequently, according to this thin-film magnetic head, if this distance is long, the throat height is great, too. As a result, it may be impossible to generate a magnetic field sufficient for writing from the medium facing surface. On the other hand, if the above-mentioned distance is short, the area in which the pole portion layer and the yoke portion layer of each of the top and bottom pole layers are in contact with each other is reduced. As a result, it is impossible to supply a sufficient magnetic flux from the yoke portion layers to the pole portion layers. Consequently, it may also be impossible to generate a magnetic field sufficient for writing from the medium facing surface.

If the technique disclosed in the Published Unexamined Japanese Patent Application 2001-118214 is used, the area in which the pole portion layer and the yoke portion layer of the top pole layer are in contact with each other is increased while the throat height is reduced. Through this technique, however, the photoresist frame is not formed on a flat surface but formed on a surface having a difference in level created by the insulating layer for defining the throat height. As a result, it is difficult to form the photoresist frame with accuracy. Therefore, this technique has a problem that it is difficult to reduce variations in pole width when the pole width is reduced down to 0.3 µm or smaller, for example.

OBJECT AND SUMMARY OF THE INVENTION

It is an object of the invention to provide a thin-film magnetic head and a method of manufacturing the same, a head gimbal assembly, and a hard disk drive for precisely forming the pole portion that defines a small track width and for improving the writing characteristics.

A thin-film magnetic head of the invention comprises: a medium facing surface that faces toward a recording medium; a first pole layer and a second pole layer magnetically coupled to each and including pole portions that are opposed to each other and disposed in regions on a side of the medium facing surface; a gap layer provided between the pole portion of the first pole layer and the pole portion of the second pole layer; a thin-film coil at least part of which is disposed between the first and second pole layers and insulated from the first and second pole layers; and a substrate. The first and second pole layers, the gap layer and the thin-film coil are stacked on the substrate, and the first pole layer is located closer to the substrate than the second pole layer.

According to the thin-film magnetic head of the invention, the first pole layer incorporates: a first pole portion layer including the pole portion of the first pole layer; and a first yoke portion layer connected to the first pole portion layer. The second pole layer incorporates: a second pole portion layer including the pole portion of the second pole layer; and a second yoke portion layer connected to the second pole portion layer. The first pole portion layer, the gap layer and the second pole portion layer have cross sections of the same shapes, the cross sections being parallel to a top surface of the substrate. Portions of the first yoke portion layer and the second yoke portion layer located at a distance from the medium facing surface are coupled to each other. An aggregate of the first pole portion layer, the gap layer and the second pole portion layer includes: a first portion having a width that defines a track width and having an end located in the medium facing surface and the other end located at a distance from the medium facing surface; and a second portion having a width greater than the width of the first portion and coupled to the other end of the first portion.

According to the thin-film magnetic head of the invention, where the width of the first portion is W and the distance from the medium facing surface to the interface between the first portion and the second portion is L, L/W falls within a range of 2 to 5 inclusive. Where the area of each of the cross sections of the first pole portion layer, the gap layer and the second pole portion layer that are parallel to the top surface of the substrate is S, S/(W×L) falls within a range of 5 to 40 inclusive. As a result, the writing characteristics of the thin-film magnetic head are improved.

A method of manufacturing the thin-film magnetic head of the invention comprises the steps of forming the first yoke portion layer; forming the first pole portion layer, the gap layer and the second pole portion layer one by one on the first yoke portion layer through the use of a single frame; forming the thin-film coil; and forming the second yoke portion layer.

According to the method of the invention, plating may be used in the step of forming the first pole portion layer, the gap layer and the second pole portion layer.

A head gimbal assembly of the invention comprises: a slider including the thin-film magnetic head of the invention and disposed to face toward a recording medium; and a suspension flexibly supporting the slider.

A hard disk drive of the invention comprises: a slider including a thin-film magnetic head of the invention and disposed to face toward a circular-plate-shaped recording medium that is rotated and driven; and an alignment device supporting the slider and aligning the slider with respect to the recording medium.

Other and further objects, features and advantages of the invention will appear more fully from the following description.

DETAILED DESCRIPTION OF THE PREFERRED EMBODIMENT

Figure 1:
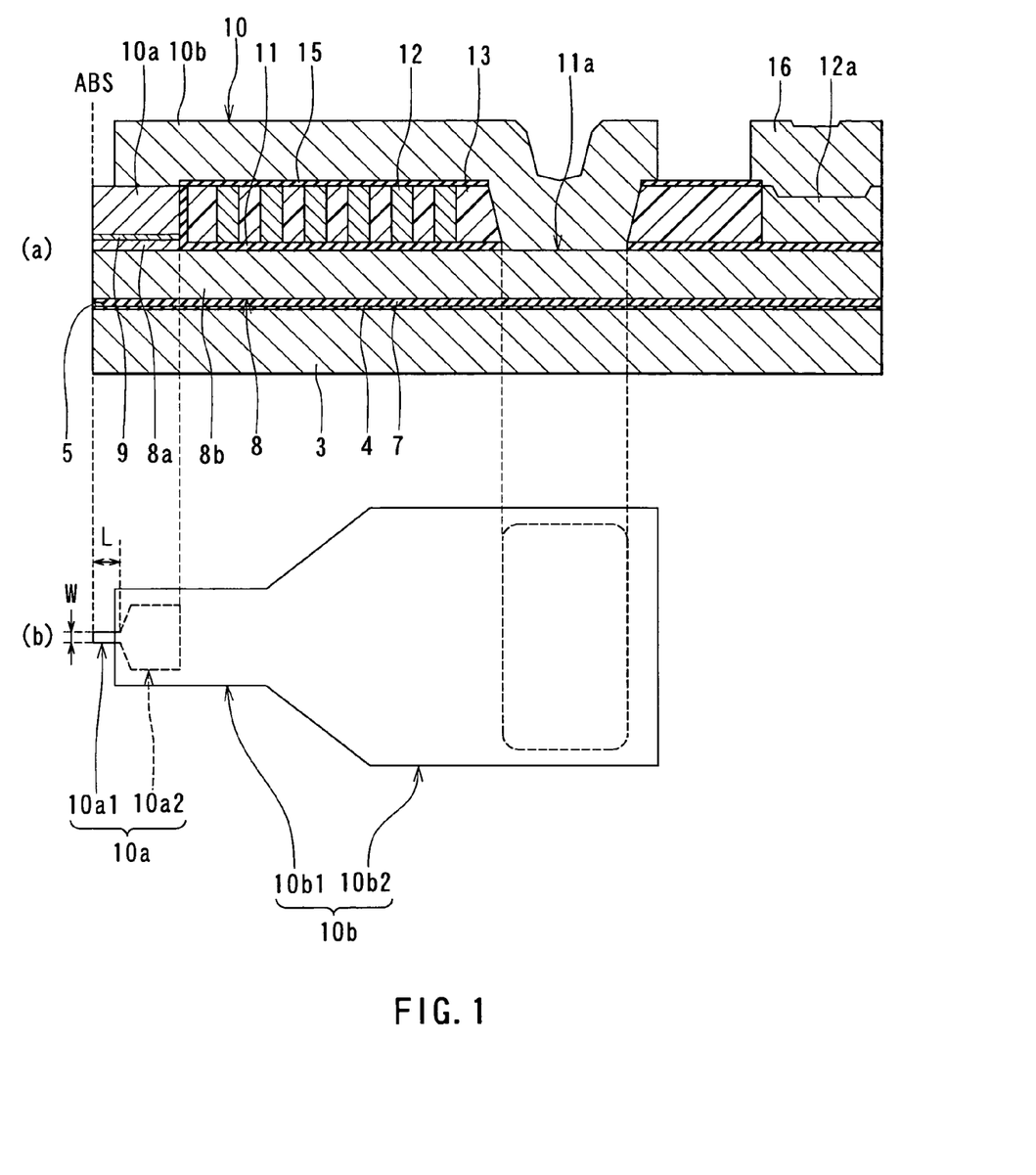
FIG. 1 illustrates the main part of a thin-film magnetic head of an embodiment of the invention.
Figure 12:
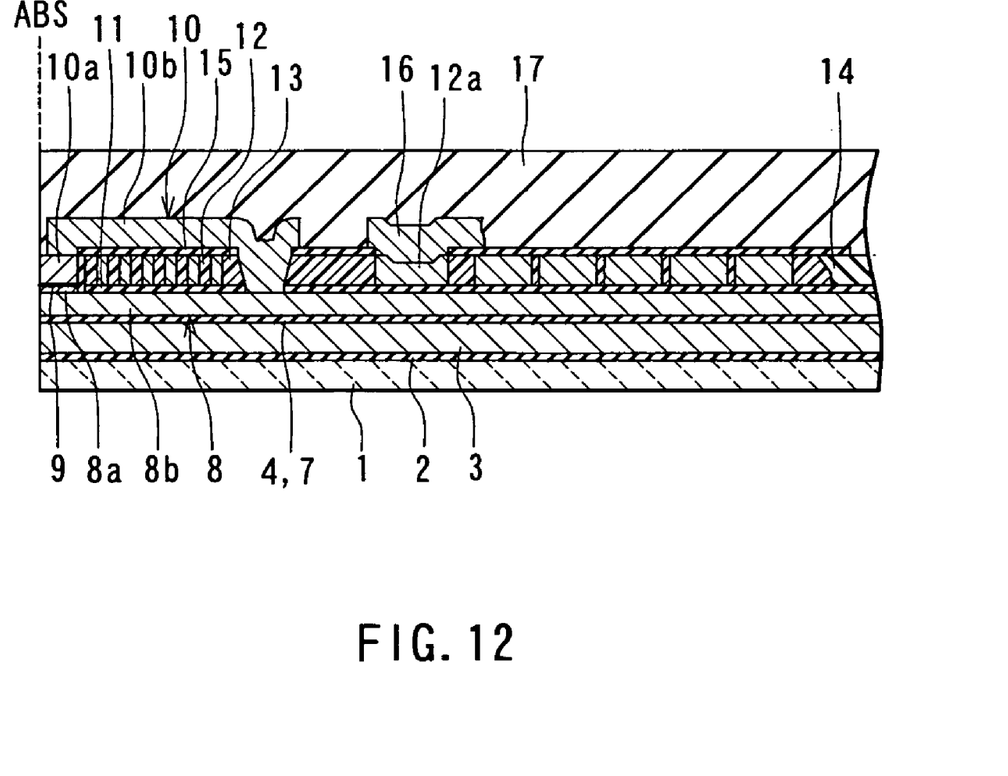
FIG. 12 is a cross-sectional view for illustrating a step that follows the step shown in FIG. 11.

A preferred embodiment of the invention will now be described in detail with reference to the accompanying drawings. Reference is now made to FIG. 1 and FIG. 12 to describe the configuration of a thin-film magnetic head of an embodiment of the invention. FIG. 1 illustrates the main part of the thin-film magnetic head of the embodiment. FIG. 1(a) illustrates a cross section of the main part of the thin-film magnetic head orthogonal to the medium facing surface and a surface of a substrate. FIG. 1(b) illustrates a plane geometry of a top pole layer of the thin-film magnetic head. FIG. 12 illustrates a cross section of the thin-film magnetic head orthogonal to the medium facing surface and the substrate surface.

The thin-film magnetic head of the embodiment comprises: a substrate 1 made of a ceramic such as aluminum oxide and titanium carbide ($Al_2O_3$—TiC); an insulting layer 2 made of an insulating material such as alumina ($Al_2O_3$) and formed on the substrate 1; a bottom shield layer 3 made of a magnetic material and formed on the insulating layer 2; a bottom shield gap film 4 formed on the bottom shield layer 3; and an MR element 5 for reading formed on the bottom shield gap film 4. The bottom shield layer 3 may be made of NiFe, for example. The bottom shield gap film 4 may be made of $Al_2O_3$, for example.

The thin-film magnetic head further comprises: a top shield gap film 7 formed on the bottom shield gap film 4 and the MR element 5; and a first yoke portion layer 8b made of a magnetic material and formed on the top shield gap film 7. The first yoke portion layer 8b serves as a portion of a bottom pole layer 8 of the write head and a top shield layer of the read head, too. The top shield gap film 7 may be made of $Al_2O_3$, for example. The first yoke portion layer 8b may be made of a magnetic material, such as NiFe or CoNiFe, that is capable of being formed into a layer by plating. In FIG. 12 the bottom shield gap film 4 and the top shield gap film 7 are shown in combination and the MR element 5 is omitted.

The MR element 5 has an end that is located in the medium facing surface (the air bearing surface) ABS. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. A pair of lead layers (not shown) are connected to the MR element 5.

In place of the first yoke portion layer 8b, a top shield layer, a separating layer made of a nonmagnetic material and formed on the top shield layer, and a yoke portion layer formed on the separating layer may be provided.

The thin-film magnetic head further comprises: a first pole portion layer 8a made of a magnetic material and formed on the first yoke portion layer 8b; a write gap layer 9 made of a nonmagnetic material and formed on the first pole portion layer 8a; and a second pole portion layer 10a made of a magnetic material and formed on the write gap layer 9. The first pole portion layer 8a and the second pole portion layer 10a may be made of a magnetic material, such as NiFe or CoNiFe, that is capable of being formed into a layer by plating. More preferably, the first pole portion layer 8a and the second pole portion layer 10a may be made of a high saturation flux density material. The first pole portion layer 8a and the first yoke portion layer 8b make up the bottom pole layer 8. The write gap layer 9 may be made of a nonmagnetic metal material, such as NiP, that is capable of being formed into a layer by plating.

The thin-film magnetic head further comprises an insulating layer 11 formed on a portion of the first yoke portion layer 8b located in a region farther from the medium facing surface ABS than the first pole portion layer 8a, the write gap layer 9 and the second pole portion layer 10a. The thin-film magnetic head further comprises a thin-film coil 12 formed on the insulating layer 11. The insulating layer 11 has a contact hole 11a located in the center of the thin-film coil 12. The insulating layer 11 may be made of $Al_2O_3$, for example. The thin-film coil 12 may be made of a conductive material such as copper. The thin-film coil 12 is wound around the contact hole 11a. In FIG. 1 and FIG. 12 numeral 12a indicates a connecting portion of the thin-film coil 12 that is connected to a lead layer 16 that will be described later.

The thin-film magnetic head further comprises: an insulating layer 13 with which the space between adjacent ones of the turns of the thin-film coil 12 is filled, the insulating layer 13 touching an inner end and an outer end of the coil 12; an insulating layer 14 formed around the first pole portion layer 8a, the write gap layer 9, the second pole portion layer 10a and the insulating layer 13; and an insulating layer 15 that covers the top surface of the coil 12. The insulating layer 13 may be made of photoresist, for example. The insulating layers 14 and 15 may be made of $Al_2O_3$, for example.

The thin-film magnetic head further comprises a second yoke portion layer 10b that is made of a magnetic material and couples the second pole portion layer 10a to the bottom pole layer 8. The second yoke portion layer 10b has a portion near an end thereof located on a side of the medium facing surface ABS, this portion touching the top surface of the second pole portion layer 10a. The end of the second yoke portion layer 10b located on a side of the medium facing surface ABS is disposed at a distance from the medium facing surface ABS. The second yoke portion layer 10b passes through the contact hole 11a and is connected to the first yoke portion layer 8b. The second yoke portion layer 10b may be made of a magnetic material, such as NiFe or CoNiFe, that is capable of being formed into a layer by plating. The second pole portion layer 10a and the second yoke portion layer 10b make up a top pole layer 10.

The thin-film magnetic head further comprises the lead layer 16 connected to the connecting portion 12a of the thin-film coil 12. The lead layer 16 is made of a conductive material. The lead layer 16 may be made of a material the same as that of the second yoke portion layer 10b.

The thin-film magnetic head further comprises an overcoat layer 17 that is made of an insulating material and covers the second yoke portion layer 10b, the insulating layer 14 and the insulating layer 15. The overcoat layer 17 may be made of $Al_2O_3$, for example.

As described so far, the thin-film magnetic head of the embodiment comprises the medium facing surface ABS that faces toward a recording medium, the read head, the write head (the induction-type electromagnetic transducer), and the substrate 1. The read head and the write head are stacked on the substrate 1. The read head is located closer to the substrate 1 than the write head.

The read head incorporates the MR element 5, and the bottom shield layer 3 and the top shield layer (the first yoke portion layer 8b) for shielding the MR element 5. Portions of the bottom shield layer 3 and the top shield layer that are located on a side of the medium facing surface ABS are opposed to each other, the MR element 5 being placed between these portions.

The write head incorporates the bottom pole layer 8 and the top pole layer 10 that are magnetically coupled to each other and include the pole portions that are opposed to each other and placed in regions on a side of the medium facing surface ABS. The write head further incorporates: the write gap layer 9 provided between the pole portion of the bottom pole layer 8 and the pole portion of the top pole layer 10; and the thin-film coil 12 at least part of which is placed between the bottom pole layer 8 and the top pole layer 10 and insulated from the bottom pole layer 8 and the top pole layer 10. The bottom pole layer 8, the write gap layer 9, the thin-film coil 12 and the top pole layer 10 are stacked on the substrate 1. The bottom pole layer 8 is disposed closer to the substrate 1 than the top pole layer 10. According to the embodiment, the bottom pole layer 8 corresponds to the first pole layer of the invention. The top pole layer 10 corresponds to the second pole layer of the invention.

The bottom pole layer 8 incorporates the first pole portion layer 8a including the pole portion of the bottom pole layer 8, and the first yoke portion layer 8b connected to the first pole portion layer 8a. The top pole layer 10 incorporates the second pole portion layer 10a including the pole portion of the top pole layer 10, and the second yoke portion layer 10b connected to the second pole portion layer 10a. The first pole portion layer 8a and the second pole portion layer 10a are opposed to each other, the write gap layer 9 being disposed in between. The first pole portion layer 8a, the write gap layer 9 and the second pole portion layer 10a have cross sections of the same shapes, the cross sections being parallel to the top surface of the substrate 1.

As shown in FIG. 1(b), the second pole portion layer 10a includes a first portion 10a1 and a second portion 10a2. The first portion 10a1 has a width that defines the track width and has an end located in the medium facing surface ABS and the other end located at a distance from the medium facing surface ABS. The second portion 10a2 is coupled to the other end of the first portion 10a1. The second portion 10a2 has a width that is equal to the width of the first portion 10a1 at the interface with the first portion 10a1 and that gradually increases as the distance from the first portion 10a1 increases and then maintains a specific width to the end of the second portion 10a2. Each of the write gap layer 9 and the first pole portion layer 8a includes a first portion and a second portion, too, that have plane geometries the same as those of the first portion 10a1 and the second portion 10a2.

The second yoke portion layer 10b includes a first portion 10b1 and a second portion 10b2. The first portion 10b1 has a uniform width and has an end located on a side of the medium facing surface ABS and the other end. The second portion 10b2 is coupled to the other end of the first portion 10b1. The one of the ends of the first portion 10b1 is located in a position that falls in a range from the medium facing surface ABS to the interface between the first portion 10a1 and the second portion 10a2 of the second pole portion layer 10a. The first portion 10b1 has a width greater than the maximum width of the second portion 10a2 of the second pole portion layer 10a. The second portion 10b2 has a width that is equal to the width of the first portion 10b1 at the interface with the first portion 10b1 and that gradually increases as the distance from the first portion 10b1 increases and then maintains a specific width to the end of the second portion 10b2.

Figure 2:
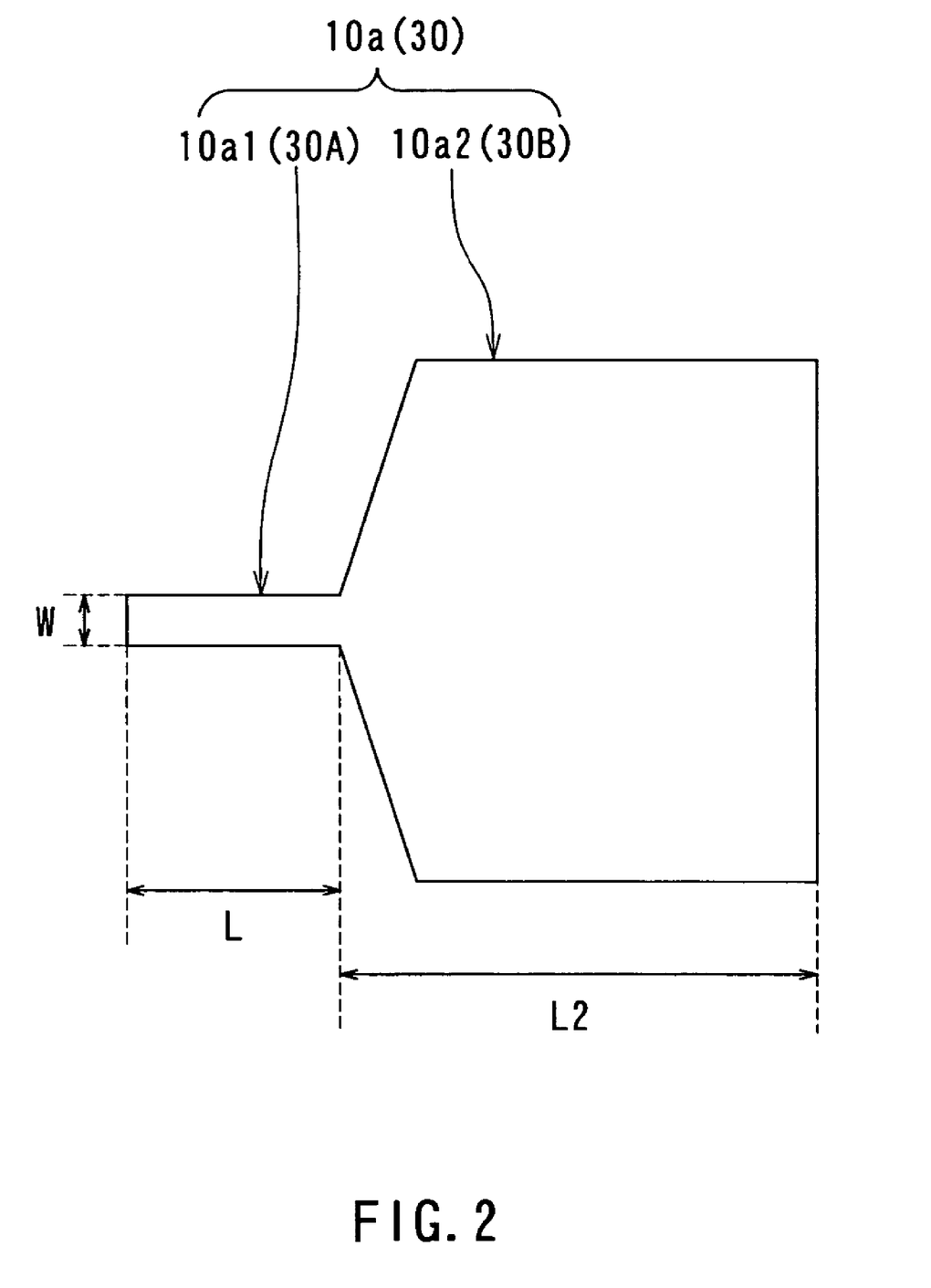
FIG. 2 is a top view of an aggregate of a first pole portion layer, a write gap layer and a second pole portion layer of the embodiment.
Figure 3:
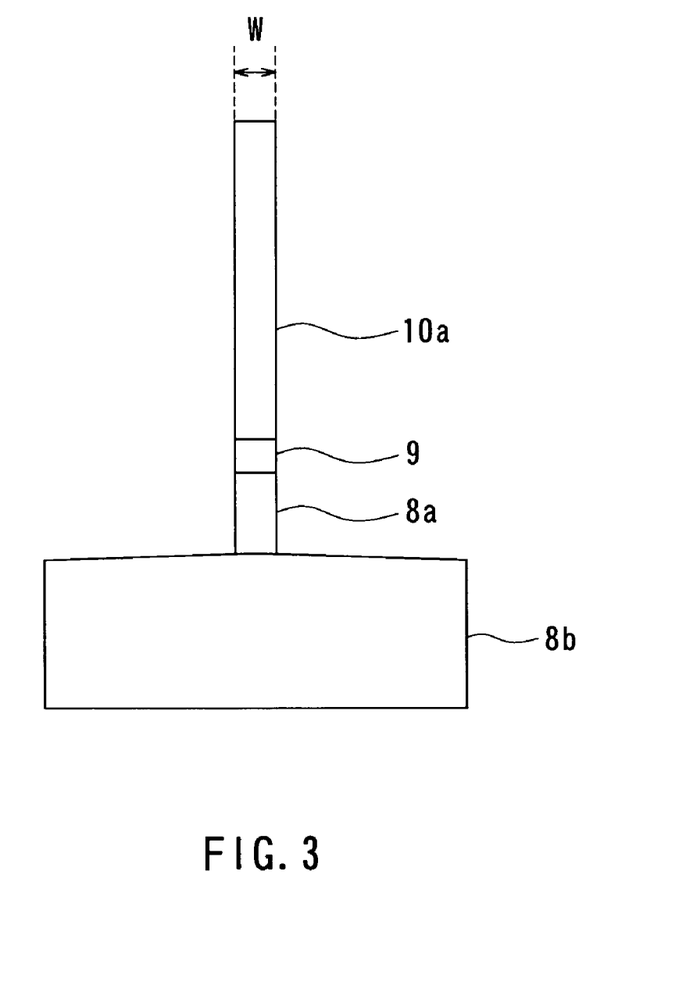
FIG. 3 is a front view of the aggregate shown in FIG. 2.

Reference is now made to FIG. 2 and FIG. 3 to give a detailed description of the configuration of the pole portions of the bottom pole layer 8 and the top pole layer 10 and a neighborhood thereof. FIG. 2 is a top view of the aggregate of the first pole portion layer 8a, the write gap layer 9 and the second pole portion layer 10a. FIG. 3 is a front view of this aggregate seen from the medium facing surface ABS.

The aggregate 30 of the first pole portion layer 8a, the write gap layer 9 and the second pole portion layer 10a includes a first portion 30A and a second portion 30B. The first portion 30A has a width that defines the track width and has an end located in the medium facing surface ABS and the other end located at a distance from the medium facing surface ABS. The second portion 30B is coupled to the other end of the first portion 30A and has a width greater than the width of the first portion 30A. The first portion 30A and the second portion 30B have plane geometries the same as those of the first portion 10a1 and the second portion 10a2 of the second pole portion layer 10a as described above.

According to the embodiment, where the width of the first portion 30A is W and the distance from the medium facing surface ABS to the interface between the first portion 30A and the second portion 30B is L, L/W falls within a range between 2 and 5 inclusive. Furthermore, according to the embodiment, where the area of each of the cross sections of the first pole portion layer 8a, the write gap layer 9 and the second pole portion layer 10a that are parallel to the top surface of the substrate 1 is S, S/(W×L) falls within a range between 5 and 40 inclusive. The reasons for these features will be described in detail below. In FIG. 2 'L2' indicates the length of the second portion 30B orthogonal to the medium facing surface ABS.

Reference is now made to FIG. 4 to FIG. 12 to describe a method of manufacturing the thin-film magnetic head of the embodiment. FIG. 4 to FIG. 12 are cross sections orthogonal to the medium facing surface and the substrate surface. Although the method of manufacturing a single thin-film magnetic head will be described, a plurality of thin-film magnetic heads are actually fabricated at the same time through the use of a single wafer (substrate), according to the embodiment.

Figure 4:
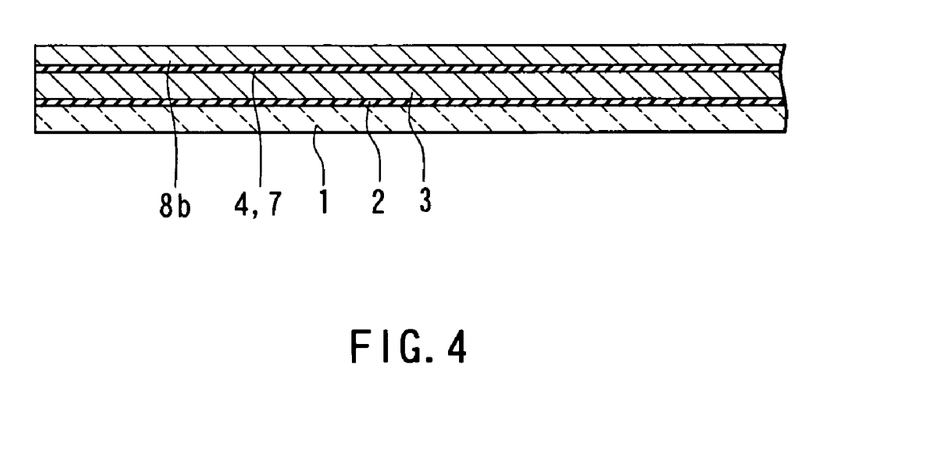
FIG. 4 is a cross-sectional view for illustrating a step of a method of manufacturing the thin-film magnetic head of the embodiment.

In the method of the embodiment, as shown in FIG. 4, the insulating layer 2 is formed by sputtering, for example, on the substrate 1. Next, on the insulating layer 2, the bottom shield layer 3 is formed by sputtering or plating.

Next, on the bottom shield layer 3, the bottom shield gap film 4 is formed by sputtering, for example. Although not shown in FIG. 4, on the bottom shield gap film 4, the MR element 5 is formed by sputtering, for example. Next, on the bottom shield gap film 4, a pair of lead layers not shown are formed by sputtering, for example. The lead layers are electrically connected to the MR element 5. Next, the top shield gap film 7 is formed by sputtering, for example, on the bottom shield gap film 4, the MR element 5 and the lead layers.

The above-mentioned layers making up the read head are patterned by a typical etching method using a patterned resist layer, the liftoff method or the method using both etching and liftoff.

Next, on the top shield gap film 7, the first yoke portion layer 8b is formed by sputtering or plating, for example. Next, although not shown, an electrode film for plating is formed by sputtering, for example, on the first yoke portion layer 8b.

Figure 5:
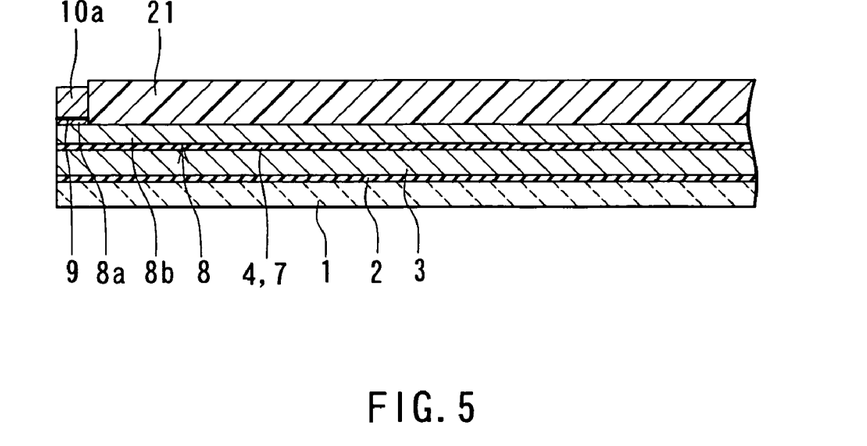
FIG. 5 is a cross-sectional view for illustrating a step that follows the step shown in FIG. 4.

Next, a photoresist layer is formed on the above-mentioned electrode film. The photoresist layer is patterned by photolithography to form a frame 21 as shown in FIG. 5. The frame 21 has an opening located in a region in which the first pole portion layer 8a, the write gap layer 9 and the second pole portion layer 10a are to be formed.

Next, the first pole portion layer 8a, the write gap layer 9 and the second pole portion layer 10a are consecutively formed by frame plating using the frame 21. Each of the first pole portion layer 8a, the write gap layer 9 and the second pole portion layer 10a is made of a magnetic material capable of being formed into a layer by plating. The write gap layer 9 is made of a nonmagnetic metal material capable of being formed into a layer by plating.

Next, the frame 21 is removed. A portion of the electrode film for plating except a portion underlying the first pole portion layer 8a is removed by etching.

Figure 6:
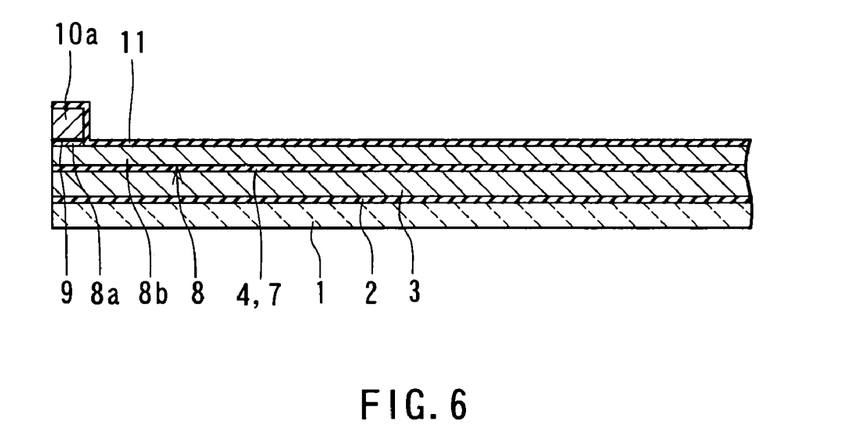
FIG. 6 is a cross-sectional view for illustrating a step that follows the step shown in FIG. 5.

Next, as shown in FIG. 6, the insulating layer 11 is formed by sputtering, for example, on the entire top surface of the layered structure obtained through the foregoing steps. The insulating layer 11 is formed on the sidewalls of the aggregate of the first pole portion layer 8a, the write gap layer 9 and the second pole portion layer 10a, too.

Figure 7:
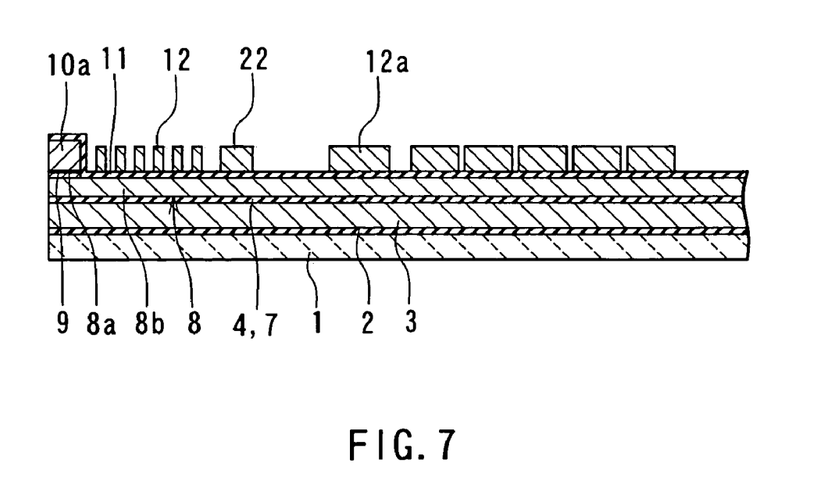
FIG. 7 is a cross-sectional view for illustrating a step that follows the step shown in FIG. 6.

Next, as shown in FIG. 7, the thin-film coil 12 is formed by frame plating, for example, on the insulating layer 11. At the same time, a dummy layer 22 is formed on a portion of the insulating layer 11 in which the first yoke portion layer 8b is coupled to the second yoke portion layer 10b.

Figure 8:
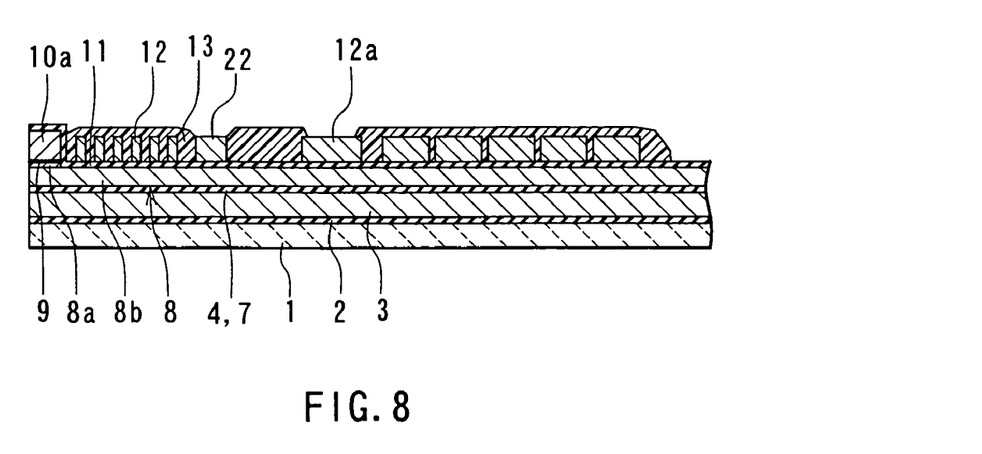
FIG. 8 is a cross-sectional view for illustrating a step that follows the step shown in FIG. 7.
Figure 9:
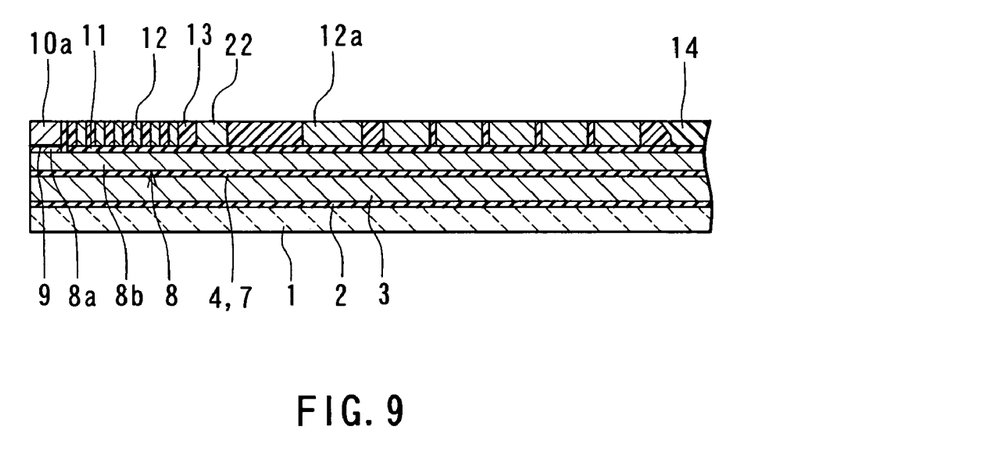
FIG. 9 is a cross-sectional view for illustrating a step that follows the step shown in FIG. 8.

Next, as shown in FIG. 8, an insulating layer 13 is formed to cover the thin-film coil 12. Next, an insulating layer 14 is formed to cover the entire layered structure. At this time the insulating layer 14 has a thickness equal to or greater than the thickness of the coil 12. Next, as shown in FIG. 9, the insulating layer 14 is polished by chemical mechanical polishing, for example, so that the coil 12 and the dummy layer 22 are exposed.

Figure 10:
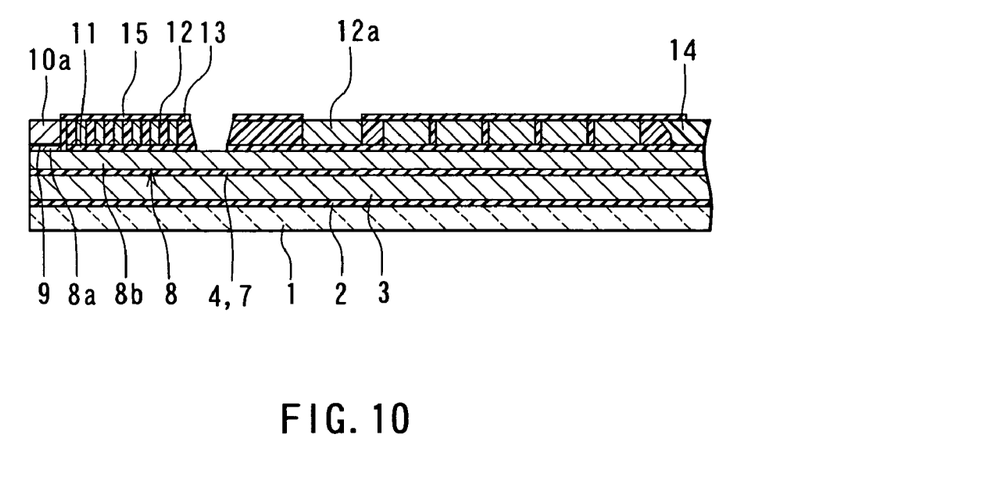
FIG. 10 is a cross-sectional view for illustrating a step that follows the step shown in FIG. 9.

Next, as shown in FIG. 10, an insulating layer 15 is formed on the entire top surface of the layered structure. A portion of the insulating layer 15 located on the second pole portion layer 10a, the dummy layer 22 and the connecting portion 12a of the thin-film coil 12 is selectively etched. Selective etching is further performed to remove the dummy layer 22 and a portion of the insulating layer 11 underlying the dummy layer 22.

Figure 11:
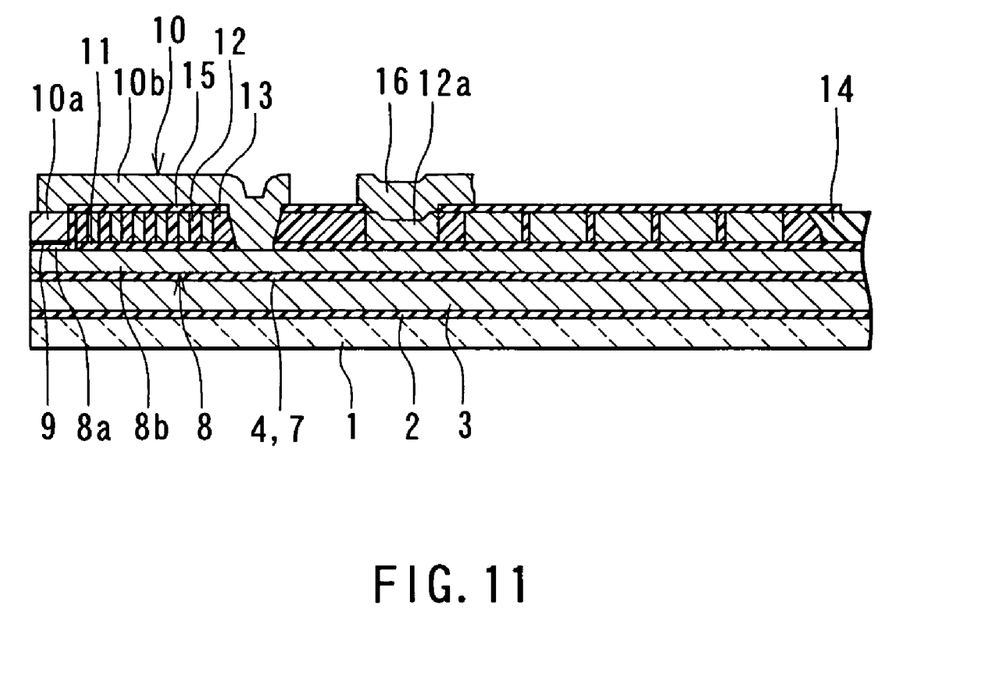
FIG. 11 is a cross-sectional view for illustrating a step that follows the step shown in FIG. 10.

Next, as shown in FIG. 11, the second yoke portion layer 10b and the lead layer 16 is formed by frame plating, for example.

Next, as shown in FIG. 12, the overcoat layer 17 is formed by sputtering, for example, to cover the entire layered structure. Finally, lapping of the slider including the foregoing layers is performed to form the medium facing surface ABS of the thin-film magnetic head including the write head and the read head. The thin-film magnetic head is thus completed.

The operation of the thin-film magnetic head of the embodiment will now be described. The thin-film magnetic head writes data on a recording medium by using the write head and reads data written on the recording medium by using the read head. In the write head the thin-film coil 12 generates a magnetic field that corresponds to the data to be written on the medium. The bottom pole layer 8 and the top pole layer 10 allow a magnetic flux corresponding to the magnetic field generated by the coil 12 to pass therethrough. In the medium facing surface ABS a magnetic field used for writing the data on the medium is generated by the first pole portion layer 8a and the second pole portion layer 10a.

According to the embodiment, the first pole portion layer 8a, the write gap layer 9 and the second pole portion layer 10a have cross sections of the same shapes, the cross sections being parallel to the top surface of the substrate 1. In addition, the first pole portion layer 8a, the write gap layer 9 and the second pole portion layer 10a are formed in sequence on the flat surface of the first yoke portion layer 8b by plating through the use of the single frame 21. In such a manner, according to the embodiment, the pole width is controllable by photolithography, and the frame 21 that controls the pole width is formed on the flat surface. It is thereby possible to form the pole portion that defines a reduced track width of 0.3 µm or smaller, for example, with accuracy, and to reduce variations in pole width of a plurality of thin-film magnetic heads manufactured out of a single wafer.

According to the embodiment, the aggregate 30 of the first pole portion layer 8a, the write gap layer 9 and the second pole portion layer 10a includes the first portion 30A and the second portion 30B. The first portion 30A has a width that defines the track width and has an end located in the medium facing surface ABS and the other end located at a distance from the medium facing surface ABS. The second portion 30B is coupled to the other end of the first portion 30A and has a width greater than the width of the first portion 30A. Where the width of the first portion 30A is W and the distance from the medium facing surface ABS to the interface between the first portion 30A and the second portion 30B is L, L/W falls within a range between 2 and 5 inclusive. Moreover, where the area of each of the cross sections of the first pole portion layer 8a, the write gap layer 9 and the second pole portion layer 10a that are parallel to the top surface of the substrate 1 is S, S/(W×L) falls within a range between 5 and 40 inclusive. As a result, according to the embodiment, the writing characteristics of the thin-film magnetic head are improved even if the track width is reduced down to 0.3 µm or smaller, for example. The following are descriptions of two experiments performed to find out the relationship between the writing characteristics and L/W and S/(W×L).

In each of the experiments a plurality of thin-film magnetic heads incorporating the aggregates 30 having different shapes were fabricated, and overwrite properties and side erase suppressing properties were measured as the writing characteristics of the thin-film magnetic heads. The overwrite properties will be indicated with OW and the side erase suppressing properties will be indicated with ATE below.

The overwrite properties OW were measured as follows. First, data was written on a specific track, using a signal at a frequency of 50 MHz. Next, the data was read from the track, and the magnitude of a component of a frequency of 50 MHz of the read signal obtained was defined as TAA1. Next, data is written over the same track, using a signal at a frequency of 300 MHz. Next, the data was written from the track, and the magnitude of a component of a frequency of 50 MHz of the read signal obtained was defined as TAA2. The overwrite property OW was obtained through the use of the equation below.

$$OW(dB) = 20 \log_{10}(TAA2/TAA1)$$

The side erase suppressing properties ATE were measured as follows. First, data was written in each of adjacent first to third tracks, using a signal at a frequency of 249 MHz, a signal at a frequency of 250 MHz, and a signal at a frequency of 249 MHz, respectively. The second track was the middle track, the first track was the track on the left of the second track, and the third track was the track on the right of the second track. Next, the data was read from each of the first and third tracks, and the magnitude of a component of a frequency of 249 MHz of the read signal obtained was defined as TAA3. Next, data was written over the second track 10,000 times, using a signal at a frequency of 250 MHz. Next, the data was read from each of the first and third tracks, and the magnitude of a component of a frequency of 249 MHz of the read signal obtained was defined as TAA4. The side erase suppressing property ATE was obtained through the use of the equation below. In the experiments the smaller one of the value of ATE obtained from the read signal of the first track and the value of ATE obtained from the read signal of the third track was used for evaluation.

$$ATE(\%)=(TAA4/TAA3)\times 100$$

Figure 17:
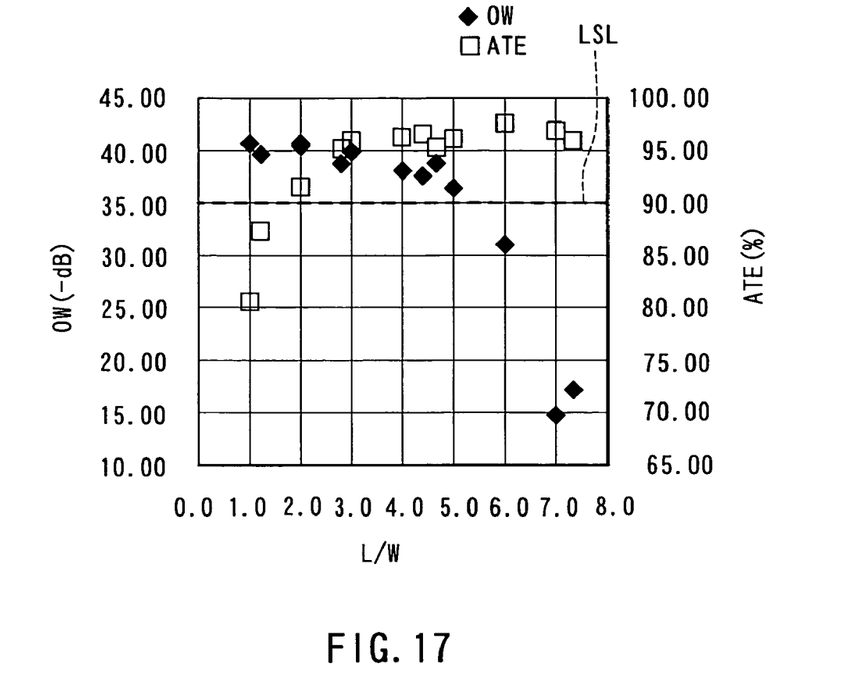
FIG. 17 is a plot that shows a result of a first experiment relating to the embodiment of the invention.

The table below shows W (μm), L (μm), L/W, OW (−dB) and ATE (%) of the thin-film magnetic heads fabricated for the first experiment. FIG. 17 shows the relationship between L/W and each of OW (−dB) and ATE (%) of the thin-film magnetic heads fabricated for the first experiment. In each of those thin-film magnetic heads the first pole portion layer 8a had a thickness of 0.35 μm, the write gap layer 9 had a thickness of 0.15 μm, and the second pole portion layer 10a had a thickness of 1.20 μm. The second portion 30B had a length L2 of 1.80 μm that was orthogonal to the medium facing surface ABS. The second portion 30B had a maximum width of 2.00 μm.

TABLE 1

| W (μm) | L (μm) | L/W | OW (−dB) | ATE (%) |
|---|---|---|---|---|
| 0.20 | 0.20 | 1.00 | 40.70 | 80.60 |
| 0.20 | 0.40 | 2.00 | 40.50 | 91.60 |
| 0.20 | 0.60 | 3.00 | 39.90 | 96.00 |
| 0.20 | 0.80 | 4.00 | 38.20 | 96.31 |
| 0.20 | 1.00 | 5.00 | 36.50 | 96.20 |
| 0.20 | 1.20 | 6.00 | 31.10 | 97.60 |
| 0.20 | 1.40 | 7.00 | 14.80 | 96.90 |
| 0.15 | 0.30 | 2.00 | 40.70 | 91.50 |
| 0.15 | 0.70 | 4.67 | 38.80 | 95.30 |
| 0.15 | 1.10 | 7.33 | 17.20 | 96.00 |
| 0.25 | 0.30 | 1.20 | 39.80 | 87.40 |
| 0.25 | 0.70 | 2.80 | 38.80 | 95.20 |
| 0.25 | 1.10 | 4.40 | 37.60 | 96.60 |

The overwrite property OW expressed by A (−dB) indicates a greater overwriting capability where the value of A is greater. It is preferred that the value of A is 35 or greater. The side erase suppressing property ATE indicates that the side erase is suppressed to a greater degree where the value is greater. It is preferred that the side erase suppressing property ATE is 90 percent or greater. In FIG. 17 the broken line with LSL indicates the level at which OW is 35 (−dB) and ATE is 90 (%).

As shown in FIG. 17, it is noted that the condition that the value of A is 35 or greater and ATE is 90 percent or greater is satisfied in the case in which L/W falls within a range of 2 to 5 inclusive. Therefore, according to the embodiment, it is defined that L/W falls within a range of 2 to 5 inclusive. To satisfy the above-mentioned condition with greater reliability, it is preferred that L/W falls within a range of 3 to 4 inclusive.

Figure 18:
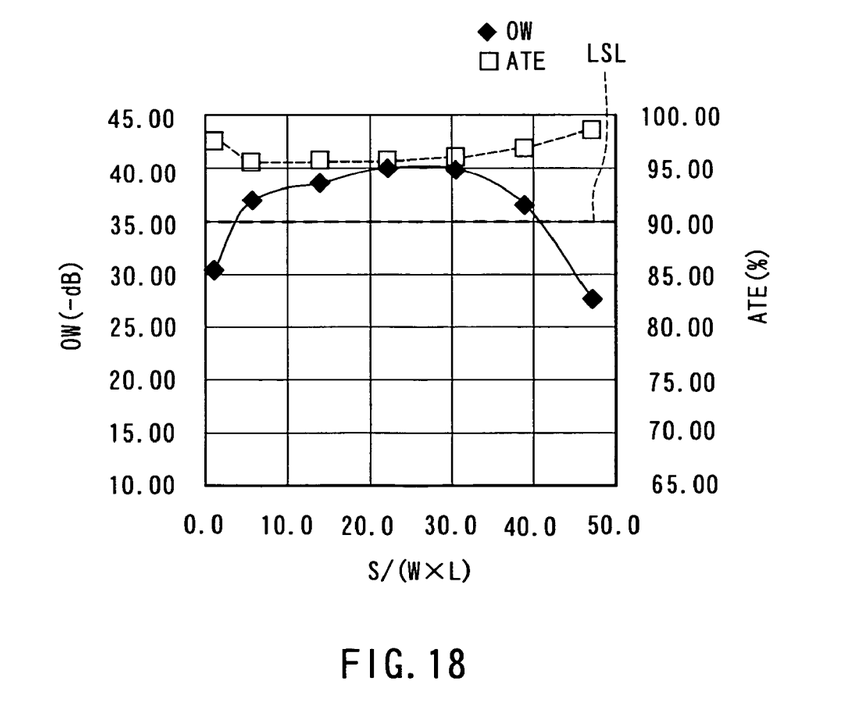
FIG. 18 is a plot that shows a result of a second experiment relating to the embodiment of the invention.

The table below shows W (μm), L (μm), L2(μm), S (μm²), S/(W×L), OW (−dB) and ATE (%) of the thin-film magnetic heads fabricated for the second experiment. FIG. 18 shows the relationship between S/(W×L) and each of OW (−dB) and ATE (%) of the thin-film magnetic heads fabricated for the second experiment. In each of those thin-film magnetic heads the first pole portion layer 8a had a thickness of 0.35 μm, the write gap layer 9 had a thickness of 0.15 μm, and the second pole portion layer 10a had a thickness of 1.20 μm. The second portion 30B had a maximum width of 2.00 μm.

TABLE 2

| W (μm) | L (μm) | L2 (μm) | S (μm²) | S/(W × L) | OW (−dB) | ATE (%) |
|---|---|---|---|---|---|---|
| 0.20 | 0.60 | 3.00 | 5.67 | 47.25 | 27.70 | 98.60 |
| 0.20 | 0.60 | 2.50 | 4.67 | 38.92 | 36.50 | 96.90 |
| 0.20 | 0.60 | 2.00 | 3.67 | 30.58 | 39.90 | 96.00 |
| 0.20 | 0.60 | 1.50 | 2.67 | 22.25 | 40.00 | 95.70 |
| 0.20 | 0.60 | 1.00 | 1.67 | 13.92 | 38.60 | 95.70 |
| 0.20 | 0.60 | 0.50 | 0.67 | 5.58 | 36.90 | 95.60 |
| 0.20 | 0.60 | 0.00 | 0.12 | 1.00 | 30.40 | 97.60 |

In FIG. 18, as in FIG. 17, the broken line with LSL indicates the level at which OW is 35 (−dB) and ATE is 90 (%).

As shown in FIG. 18, it is noted that the condition that the value of A is 35 or greater and ATE is 90 percent or greater is satisfied in the case in which S/(W×L) falls within a range of 5 to 40 inclusive. Therefore, according to the embodiment, it is defined that S/(W×L) falls within a range of 5 to 40 inclusive. To satisfy the above-mentioned condition with greater reliability, it is preferred that S/(W×L) falls within a range of 10 to 35 inclusive.

As thus described, according to the embodiment, the pole portion that defines a reduced write track width is formed with accuracy, and the writing characteristics are improved, too.

Figure 13:
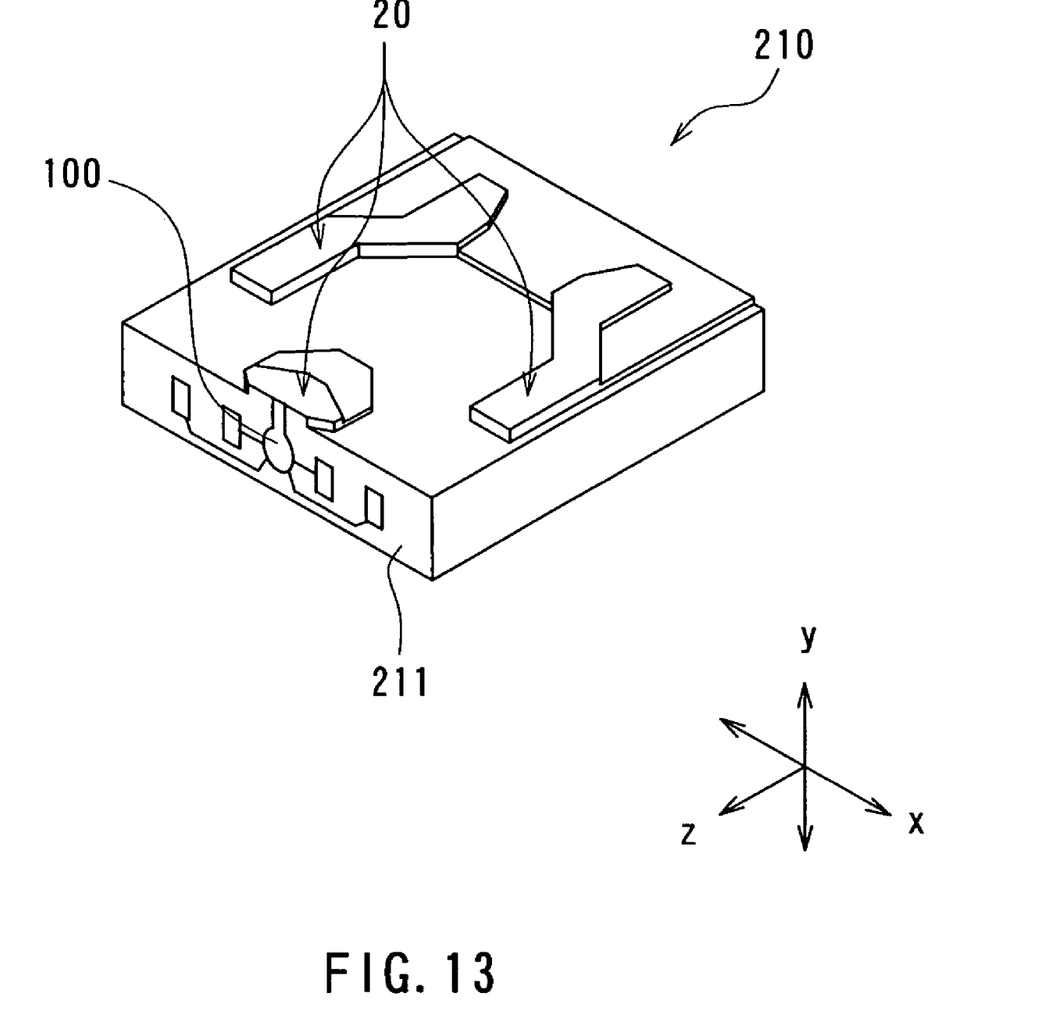
FIG. 13 is a perspective view that illustrates a slider incorporated in a head gimbal assembly of the embodiment of the invention.

A head gimbal assembly and a hard disk drive of the embodiment will now be described. Reference is made to FIG. 13 to describe a slider 210 incorporated in the head gimbal assembly. In the hard disk drive the slider 210 is placed to face toward a hard disk platter that is a circular-plate-shaped recording medium to be rotated and driven. The slider 210 has a base body 211 made up mainly of the substrate 1 and the overcoat layer 17 of FIG. 12. The base body 211 is nearly hexahedron-shaped. One of the six surfaces of the base body 211 faces toward the hard disk platter. An air bearing surface 20 that is the medium facing surface is formed in this one of the surfaces. When the hard disk platter rotates in the z direction of FIG. 13, an airflow passes between the hard disk platter and the slider 210 and a lift is thereby generated below the slider 210 in the y direction of FIG. 13 and exerted on the slider 210. The slider 210 flies over the hard disk platter by means of the lift. The x direction of FIG. 13 is across the tracks of the hard disk platter. A thin-film magnetic head 100 of the embodiment is formed near the air-outflow-side end (the end located at the lower left of FIG. 13) of the slider 210.

Figure 14:
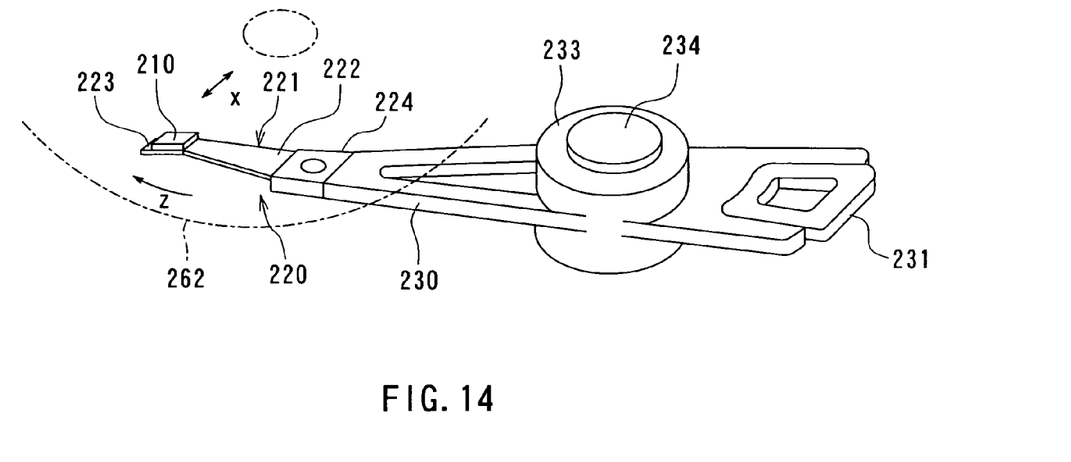
FIG. 14 is a perspective view that illustrates a head arm assembly including the head gimbal assembly of the embodiment.

Reference is now made to FIG. 14 to describe a head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the hard disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a carriage having a plurality of arms wherein the head gimbal assembly 220 is attached to each of the arms is called a head stack assembly.

FIG. 14 illustrates an example of the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 15:
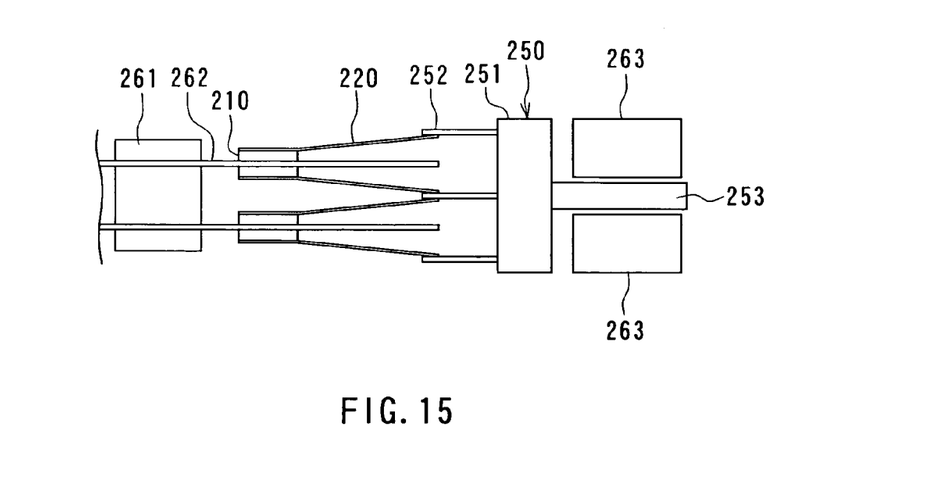
FIG. 15 illustrates the main part of a hard disk drive of the embodiment.
Figure 16:
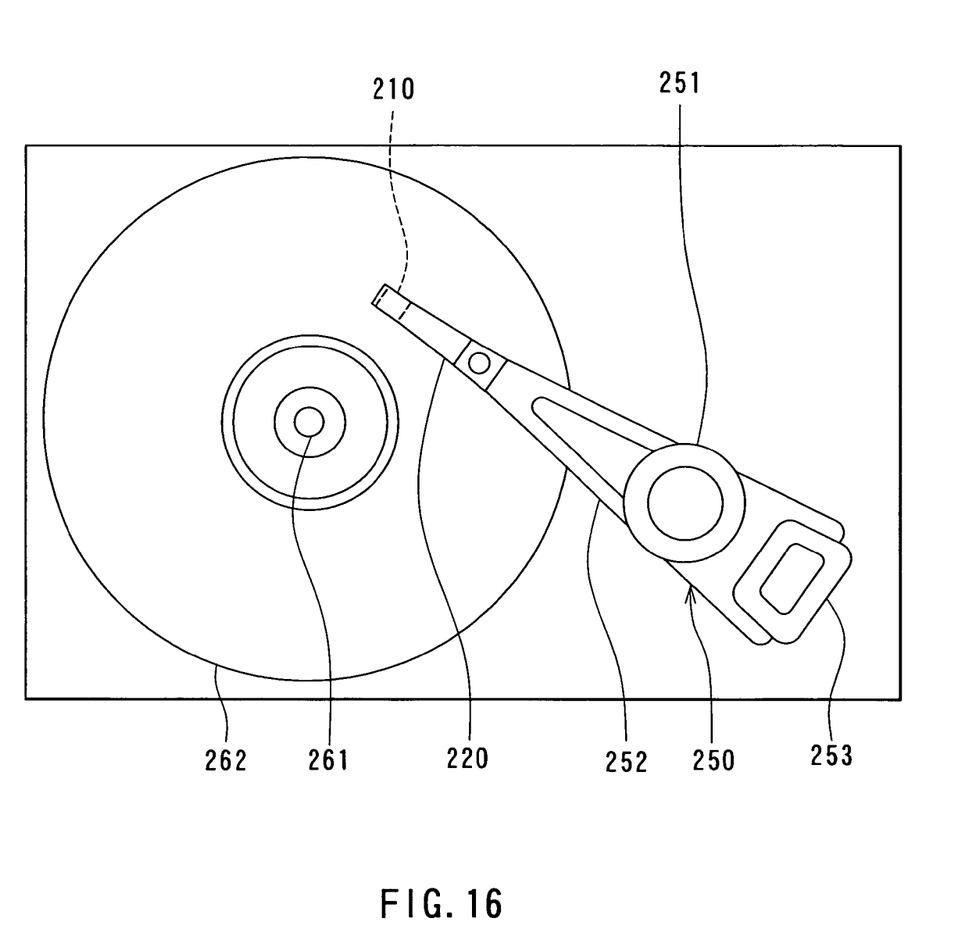
FIG. 16 is a top view of the hard disk drive of the embodiment.

Reference is now made to FIG. 15 and FIG. 16 to describe an example of the head stack assembly and the hard disk drive of the embodiment. FIG. 15 illustrates the main part of the hard disk drive. FIG. 16 is a top view of the hard disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the hard disk platters 262.

In the hard disk drive of the embodiment the actuator moves the slider 210 across the tracks of the hard disk platter 262 and aligns the slider 210 with respect to the hard disk platter 262. The thin-film magnetic head incorporated in the slider 210 writes data on the hard disk platter 262 through the use of the write head and reads data stored on the hard disk platter 262 through the use of the read head.

The head gimbal assembly and the hard disk drive of the embodiment exhibit effects similar to those of the foregoing thin-film magnetic head of the embodiment.

The present invention is not limited to the foregoing embodiment but may be practiced in still other ways. For example, the thin-film coil may be made up of a plurality of layers. The second yoke portion layer 10b may have a curved portion ranging from the end closer to the medium facing surface ABS to the portion disposed on the thin-film coil. The end of the second yoke portion layer 10b closer to the medium facing surface ABS may be exposed from the medium facing surface ABS.

In the foregoing embodiment the thin-film magnetic head is disclosed, comprising the MR element for reading formed on the base body and the induction-type electromagnetic transducer for writing stacked on the MR element. Alternatively, the MR element may be stacked on the electromagnetic transducer.

The invention is also applicable to a thin-film magnetic head dedicated to writing that comprises the induction-type electromagnetic transducer only and to a thin-film magnetic head that performs reading and writing through the use of the induction-type electromagnetic transducer.

According to the thin-film magnetic head and the method of manufacturing the same, the head gimbal assembly, or the hard disk drive of the invention described so far, the pole portion that defines a reduced write track width is formed with accuracy, and the writing characteristics are improved, too.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   a first pole layer and a second pole layer magnetically coupled to each other and including pole portions that are opposed to each other and disposed in regions on a side of the medium facing surface;
   a gap layer provided between the pole portion of the first pole layer and the pole portion of the second pole layer;
   a thin-film coil at least part of which is disposed between the first and second pole layers and insulated from the first and second pole layers; and
   a substrate wherein:
   the first and second pole layers, the gap layer and the thin-film coil are stacked on the substrate, and the first pole layer is located closer to the substrate than the second pole layer;
   the first pole layer incorporates: a first pole portion layer including the pole portion of the first pole layer; and a first yoke portion layer connected to the first pole portion layer;
   the second pole layer incorporates: a second pole portion layer including the pole portion of the second pole layer; and a second yoke portion layer connected to the second pole portion layer;
   the first pole portion layer, the gap layer and the second pole portion layer are disposed in this order on the first yoke portion layer;
   the second yoke portion layer is disposed on the second pole portion layer;
   the first pole portion layer, the gap layer and the second pole portion layer have cross sections of the same shapes, the cross sections being parallel to a top surface of the substrate;
   portions of the first yoke portion layer and the second yoke portion layer located at a distance from the medium facing surface are coupled to each other;
   an aggregate of the first pole portion layer, the gap layer and the second pole portion layer includes: a first portion having a substantially constant width that defines a track width and having an end located in the medium facing surface and the other end located at a distance from the medium facing surface; and a second portion having a width greater than the width of the first portion and coupled to the other end of the first portion;
   an end of the second yoke portion layer closer to the medium facing surface is located in a position that falls in a range from the medium facing surface to a position in the second pole portion layer at which an interface between the first portion and the second portion is located;
   the second yoke portion layer has a width greater than a maximum width of the second pole portion layer taken in the second portion;
   where the width of the first portion is W and the distance from the medium facing surface to the interface between the first portion and the second portion is L, L/W falls within a range of 2 to 5 inclusive; and where the area of each of the cross sections of the first pole portion layer, the gap layer and the second pole portion layer is S, S/(W×L) falls within a range of 5 to 40 inclusive.

2. A head gimbal assembly comprising:

a slider including a thin-film magnetic head and disposed to face toward a recording medium; and a suspension flexibly supporting the slider, the thin-film magnetic head comprising:

a medium facing surface that faces toward the recording medium;

a first pole layer and a second pole layer magnetically coupled to each other and including pole portions that are opposed to each other and disposed in regions on a side of the medium facing surface;

a gap layer provided between the pole portion of the first pole layer and the pole portion of the second pole layer;

a thin-film coil at least part of which is disposed between the first and second pole layers and insulated from the first and second pole layers; and a substrate, wherein:

the first and second pole layers, the gap layer and the thin-film coil are stacked on the substrate, and the first pole layer is located closer to the substrate than the second pole layer;

the first pole layer incorporates: a first pole portion layer including the pole portion of the first pole layer; and a first yoke portion layer connected to the first pole portion layer;

the second pole layer incorporates: a second pole portion layer including the pole portion of the second pole layer; and a second yoke portion layer connected to the second pole portion layer;

the first pole portion layer, the gap layer and the second pole portion layer are disposed in this order on the first yoke portion layer;

the second yoke portion layer is disposed on the second pole portion layer;

the first pole portion layer, the gap layer and the second pole portion layer have cross sections of the same shapes, the cross sections being parallel to a top surface of the substrate;

portions of the first yoke portion layer and the second yoke portion layer located at a distance from the medium facing surface are coupled to each other;

an aggregate of the first pole portion layer, the gap layer and the second pole portion layer includes: a first portion having a substantially constant width that defines a track width and having an end located in the medium facing surface and the other end located at a distance from the medium facing surface; and a second portion having a width greater than the width of the first portion and coupled to the other end of the first portion;

an end of the second yoke portion layer closer to the medium facing surface is located in a position that falls in a range from the medium facing surface to a position in the second pole portion layer at which an interface between the first portion and the second portion is located;

the second yoke portion layer has a width greater than a maximum width of the second pole portion layer taken in the second portion;

where the width of the first portion is W and the distance from the medium facing surface to the interface between the first portion and the second portion is L, L/W falls within a range of 2 to 5 inclusive; and where the area of each of the cross sections of the first pole portion layer, the gap layer and the second pole portion layer is S, S/(W×L) falls within a range of 5 to 40 inclusive.

3. A hard disk drive comprising:

a slider including a thin-film magnetic head and disposed to face toward a circular-plate-shaped recording medium that is rotated and driven; and an alignment device supporting the slider and aligning the slider with respect to the recording medium; the thin-film magnetic head comprising:

a medium facing surface that faces toward the recording medium;

a first pole layer and a second pole layer magnetically coupled to each other and including pole portions that are opposed to each other and disposed in regions on a side of the medium facing surface;

a gap layer provided between the pole portion of the first pole layer and the pole portion of the second pole layer;

a thin-film coil at least part of which is disposed between the first and second pole layers and insulated from the first and second pole layers; and a substrate, wherein:

the first and second pole layers, the gap layer and the thin-film coil are stacked on the substrate, and the first pole layer is located closer to the substrate than the second pole layer;

the first pole layer incorporates: a first pole portion layer including the pole portion of the first pole layer; and a first yoke portion layer connected to the first pole portion layer;

the second pole layer incorporates: a second pole portion layer including the pole portion of the second pole layer; and a second yoke portion layer connected to the second pole portion layer;

the first pole portion layer, the gap layer and the second pole portion layer are disposed in this order on the first yoke portion layer;

the second yoke portion layer is disposed on the second pole portion layer;

the first pole portion layer, the gap layer and the second pole portion layer have cross sections of the same shapes, the cross sections being parallel to a top surface of the substrate;

portions of the first yoke portion layer and the second yoke portion layer located at a distance from the medium facing surface are coupled to each other;

an aggregate of the first pole portion layer, the gap layer and the second pole portion layer includes: a first portion having a substantially constant width that defines a track width and having an end located in the medium facing surface and the other end located at a distance from the medium facing surface; and a second portion having a width greater than the width of the first portion and coupled to the other end of the first portion;

an end of the second yoke portion layer closer to the medium facing surface is located in a position that falls in a range from the medium facing surface to a position in the second pole portion layer at which an interface between the first portion and the second portion is located;

the second yoke portion layer has a width greater than a maximum width of the second pole portion layer taken in the second portion;

where the width of the first portion is W and the distance from the medium facing surface to the interface between the first portion and the second portion is L, L/W falls within a range of 2 to 5 inclusive; and where the area of each of the cross sections of the first pole portion layer, the gap layer and the second pole portion layer is S, S/(W×L) falls within a range of 5 to 40 inclusive.

* * * * *